US005583490A

United States Patent [19]
Santos et al.

[11] Patent Number: 5,583,490
[45] Date of Patent: Dec. 10, 1996

[54] RUPTURE DISK MONITORING APPARATUS

[75] Inventors: Manuel E. Santos, Strongsville; Kenneth L. Perusek, Solon, both of Ohio

[73] Assignee: HTV Industries, Inc., Gates Mills, Ohio

[21] Appl. No.: 275,450

[22] Filed: Jul. 15, 1994

[51] Int. Cl.$^6$ .................................................. G08B 21/00
[52] U.S. Cl. ...................... 340/626; 340/610; 137/68.11; 137/68.19; 137/68.18; 137/557; 200/61.08
[58] Field of Search .................................... 340/626, 610; 137/67, 68.18, 551, 557, 554, 68.11, 68.19; 200/81 R, 61.08

[56] References Cited

U.S. PATENT DOCUMENTS

| | | | |
|---|---|---|---|
| 3,770,918 | 11/1973 | Fortmann | 200/61.08 |
| 3,902,515 | 9/1975 | Douglas et al. | 137/68.18 |
| 3,936,621 | 2/1976 | Palin et al. | 200/61.08 |
| 4,270,560 | 6/1981 | Kearney | 137/68.18 |
| 4,301,938 | 11/1981 | Wood et al. | 137/68.18 |
| 4,342,988 | 8/1982 | Thompson et al. | 137/68.18 |
| 4,372,334 | 2/1983 | Paul, Jr. | 137/68.18 |
| 4,408,194 | 10/1983 | Thompson | 340/626 |
| 4,464,936 | 8/1984 | McIntire et al. | 73/705 |
| 4,951,697 | 8/1990 | Fritts | 137/68.18 |
| 4,978,947 | 12/1990 | Finnegan | 340/611 |
| 5,155,471 | 10/1992 | Ellis et al. | 340/611 |
| 5,313,194 | 5/1994 | Varos | 340/626 |

OTHER PUBLICATIONS

Brochure from Oklahoma Safety Equipment Company entitled "OSECO® Burst Disk Alarm System," dated 1989.
Excerpt from SIGRI GmbH brochure entitled "SIGI Combats Corrosion," dated Jul. 1987.
Excerpt from Kearney Industries Catalog Entitled "Kelonite Graphite Burst Disc," undated.
Excerpt from Carbone Catalog entitled "Bonite® Impervious Graphite Rupture Disk Bulletin RD-1," undated.
Brochure from Carborundum Kennecott Entitled "Falls® Impervite™ Impervious Graphite Rupture Disks," undated.
Technical Bulletin from Continental Disc Corporation Entitled "The Continental B.D.I.® Alarm System for Rupture Discs, Bulletin 10001" copyright 1983.
Installation Instructions for Continental Disk Corporation Rupture Disk Monitor entitled "Intunsically Safe System Installation," undated.
Installation Instructions for Grafsert Burst Disk Indicator Entitled "Special Grafsert w/Burst Disc Indicator (BDI)® Installation Instructions," undated.

Primary Examiner—Jeffery Hofsass
Assistant Examiner—Julie B. Lieu
Attorney, Agent, or Firm—Watts, Hoffmann, Fisher & Heinke Co LPA

[57] ABSTRACT

A monitoring apparatus for monitoring the condition of a pressure relief rupture disk disposed in a pressure relief conduit is disclosed. The monitoring apparatus includes an electrically conductive rupture disk circuit, spaced apart electrodes affixed to the rupture disk, a rupture disk energizing circuit, a comparison circuit and an alarm circuit. The resistance between the electrodes changes when the disk ruptures. The energizing circuit includes a power source coupled to one of the electrodes. The magnitude of an output signal produced at the other of the two electrodes is dependent upon the resistance between the electrodes. The comparison circuit includes means for generating a selected magnitude output signal depending on the comparison of the magnitudes of the electrode output signal and an adjustable reference signal. The alarm circuit is electrically coupled to the comparison circuit and selectively activates an indicator alarm based on the magnitude of the comparison circuit output signal.

12 Claims, 2 Drawing Sheets

RUPTURE DISK MONITORING APPARATUS

FIELD OF INVENTION

This invention relates to a monitoring apparatus for detecting rupture of an electrically conductive pressure relief rupture disk and more particularly to a pressure relief rupture disk monitoring apparatus which accurately and reliably detects rupture of the disk and is capable of use with a variety of fluids having differing electrical conductivities.

BACKGROUND OF INVENTION

Pressure relief rupture disks are widely used as a pressure release safety device in containment vessels subject to positive or negative fluid pressure. The rupture disk is normally mounted in a pressure or vacuum relief conduit extending from the containment vessel. Based on the expected pressure/vacuum operating pressures and the recommended pressure limits of the containment vessel, a rupture disk is chosen having an appropriate burst pressure.

If the pressure differential on the rupture disk exceeds the burst pressure of the disk, the disk will burst thereby decreasing the pressure or vacuum in the vessel and avoiding catastrophic failure. A rupture disk monitoring apparatus is often used in conjunction with a disk. The monitoring apparatus detects rupture of the disk and activates an alarm so that appropriate action may be taken to shut down the system, correct the condition creating the excessive vessel pressure or vacuum and install a new rupture disk.

Various pressure relief rupture disk monitoring apparatuses have been proposed for detecting the rupture of a disk and activate an alarm indicator. One such prior art monitoring apparatus uses a conductive rupture disk as part of an electrical circuit. Spaced apart electrodes are attached to the disk. The electrodes are suitably coupled to a voltage source to complete the circuit. When the disk ruptures, the resistance of the disk is expected to increase to a large value, essentially infinity, resulting in an open circuit. The open circuit condition triggers activation of an indicator alarm.

In certain fluids, bursting of the disk will not result in an open circuit condition. If the fluid in the containment vessel is electrically conductive and the rupture of the disk is accompanied by presence of the fluid in the "gap" between the electrode ends, the assumption of infinite resistance between the electrodes when the disk ruptures is incorrect. Current can flow through the fluid in the "gap" region to prevent an open circuit condition from being sensed so that the alarm indicator will not be activated.

A pressure relief rupture disk monitoring apparatus must be reliable, rugged and adaptable to work in a variety of fluids, including fluids having a substantial electrical conductivity. Furthermore, the monitoring apparatus must be easy to install and require minimal maintenance. Finally, to be successful in the marketplace, the rupture disk monitoring apparatus must be competitive in price with other monitoring devices.

SUMMARY OF INVENTION

An apparatus for monitoring the condition of a rupture disk is disclosed. The monitoring apparatus includes an electrically conductive pressure relief rupture disk disposed in a pressure relief vent, two spaced apart electrodes affixed to the rupture disk, a rupture disk energizing circuit, a comparison circuit and an alarm circuit. The rupture disk includes a membrane portion adapted to rupture when the pressure differential on the surfaces of the membrane exceeds a threshold value. The resistance between the spaced apart electrodes changes upon rupture of the disk.

The energizing circuit includes a voltage source electrically coupled to an input electrode and producing an output signal at an output electrode. The electrode output signal magnitude is dependent upon the electrical resistance between the electrodes. The energizing circuit includes an intrinsic safety barrier to limit the current across the rupture disk and the voltages at the input and output electrodes so that the monitoring apparatus can be safely operated in combustible environments. The comparison circuit includes means for comparing the output electrode signal to an adjustable reference signal. Based upon the comparison of the output electrode signal to the reference signal, an output signal is emitted. The alarm circuit is electrically coupled to the comparison circuit and selectively triggers an alarm indicator in response to the comparison circuit output signal.

According to one feature of the invention, a comparator compares the magnitude of the signal at an output electrode to a reference signal. The reference signal magnitude is chosen such that it is less than the electrode output signal if the rupture disk is intact and greater than or equal to the electrode output signal if the disk ruptures. Based on the comparison, a comparator circuit emits one of two output signals - a "high" magnitude output signal or a "low" magnitude output signal. The "high" magnitude output signal will be emitted so long as the electrode output signal exceeds the reference signal indicating that the rupture disk is intact. If the reference signal magnitude equals or exceeds the electrode output signal, then the "low" magnitude output signal will be emitted indicating that the disk has experienced a rupture. The "low" magnitude signal results in activation of an indicator alarm.

According to another feature of the invention, a grounded potentiometer and a voltage source are electrically coupled to generate the reference signal. The reference signal is taken off the potentiometer wiper arm. By changing the position of the wiper arm, the reference signal magnitude is changed in accord with the voltage divider rule. Based on an analysis of the resistance between the electrodes when the disk is intact vis-a-vis the resistance between the electrodes when the disk is ruptured and fluid is present in the rupture "gap" between the electrodes, the reference signal magnitude may be adjusted to a value intermediate the expected electrode output signal with an intact rupture disk and the expected electrode output signal with a disk which had ruptured. Thus, the apparatus of the present invention may be easily adapted to operate with a variety of fluids having differing electrical conductivities.

According to yet another feature of the invention, the monitoring apparatus includes a multiplexer electrically coupled to the comparator. The multiplexer is adapted to operate in two different modes - pass-through and latching. In the pass-through mode, the multiplexer output signal essentially "matches" the two signal magnitudes ("high" and "low") of the comparator output. That is, if the comparator emits a "high" magnitude output signal, the multiplexer will also emit a "high" magnitude output signal, if the comparator emits a "low" magnitude output signal, the multiplexer will also emit a "low" magnitude output signal. In the latching mode, if the comparator output drops to a "low" magnitude output, the multiplexer output signal is correspondingly reduced to a "low" magnitude. The multiplexer output is then "latched" at the "low" magnitude output level regardless of subsequent changes in the comparator's output signal. The multiplexer "low" magnitude output signal is maintained until a multiplexer reset is activated.

3

The fluid pressure monitoring apparatus constructed in accordance with the present invention is: a) capable of accurate determination of the condition of the rupture disk; b) adapted to function with a variety of fluids having differing electrical conductivities; c) reliable and durable over time and under a wide range of environmental conditions; d) easy to install and requiring minimal maintenance; and e) comparable in cost to other fluid pressure monitoring devices.

These and other objects of the invention will be better understood from the description of the preferred embodiment which is described in conjunction with the accompanying drawings.

DETAILED DESCRIPTION

Figure 1:
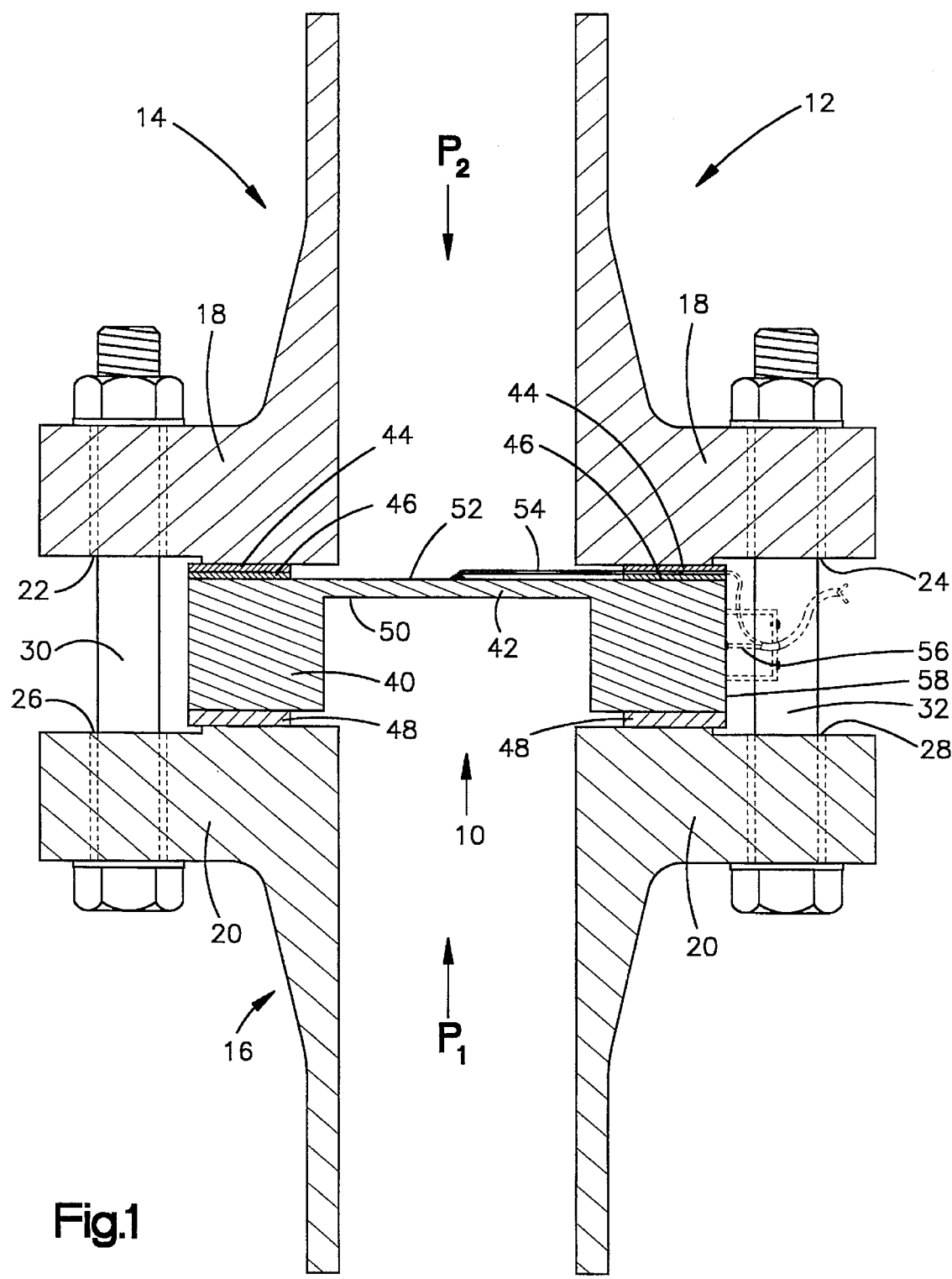
FIG. 1 is a sectional view of a pressure relief conduit having a rupture disk disposed therein.

Turning now to the drawing figures, FIG. 1 shows a pressure relief rupture disk, shown generally at 10, mounted in a pressure relief conduit, shown generally at 12. The pressure relief conduit 12 extends from a containment vessel (not shown). The rupture disk 10 is constrained between two pipe members 14, 16. The upper and lower pipes 14, 16 include flanged portions 18, 20. The flanged portions 18, 20 include apertures 22, 24, 26, 28 for accepting fastening bolts 30, 32.

The rupture disk 10 includes an outer annular support portion 40 and an inner membrane surface 42. The rupture disk annular support portion 40 and annular gaskets 44, 46, 48 are sandwiched between pipe flanged portions 18, 20 as bolts 30, 32 are tightened forming a fluid-tight seal as described in detail in U.S. Pat. No. 5,313,194 issued May 17, 1994 entitled "Rupture Disk Sensing Assembly," which is incorporated herein in its entirety by reference.

A lower surface 50 of the rupture disk membrane 42 is subjected to a pressure $P_1$ from fluid in the containment vessel (not shown). An upper surface 52 of the rupture disk membrane 42 is subjected to a pressure $P_2$, which is normally, but not necessarily, atmospheric pressure.

The rupture disk membrane 42 is electrically conductive. An input electrode 54 is affixed to the rupture disk 10, preferably near the center of the membrane surface 42. An output electrode 56 is affixed to the outer periphery of the rupture disk support portion 40. A resistance, $R_{RD}$, between the electrodes 54, 56 is determined by the conductivity of rupture disk 10.

When the pressure differential between $P_1$ and $P_2$ exceeds a burst strength of the rupture disk 10, the disk will rupture thereby changing the value of $R_{RD}$ to a new resistance value $R_B$. The resistance $R_B$ between the electrodes 54, 56 upon rupture of the disk 10 will be dependent on the electrical conductivity of the fluid in the rupture region. It is assumed that $R_B > R_{RD}$, that is, the resistance between the electrodes 54, 56 upon rupture of the disk is greater than the resistance between the electrodes when the disk is intact. It is important to note, however, that the monitoring apparatus of the present invention will also function if the reverse is true, that is, the electrode resistance when is intact is greater than the resistance between the electrodes when the disk is ruptured, $R_B < R_{RD}$.

4

Figure 2:
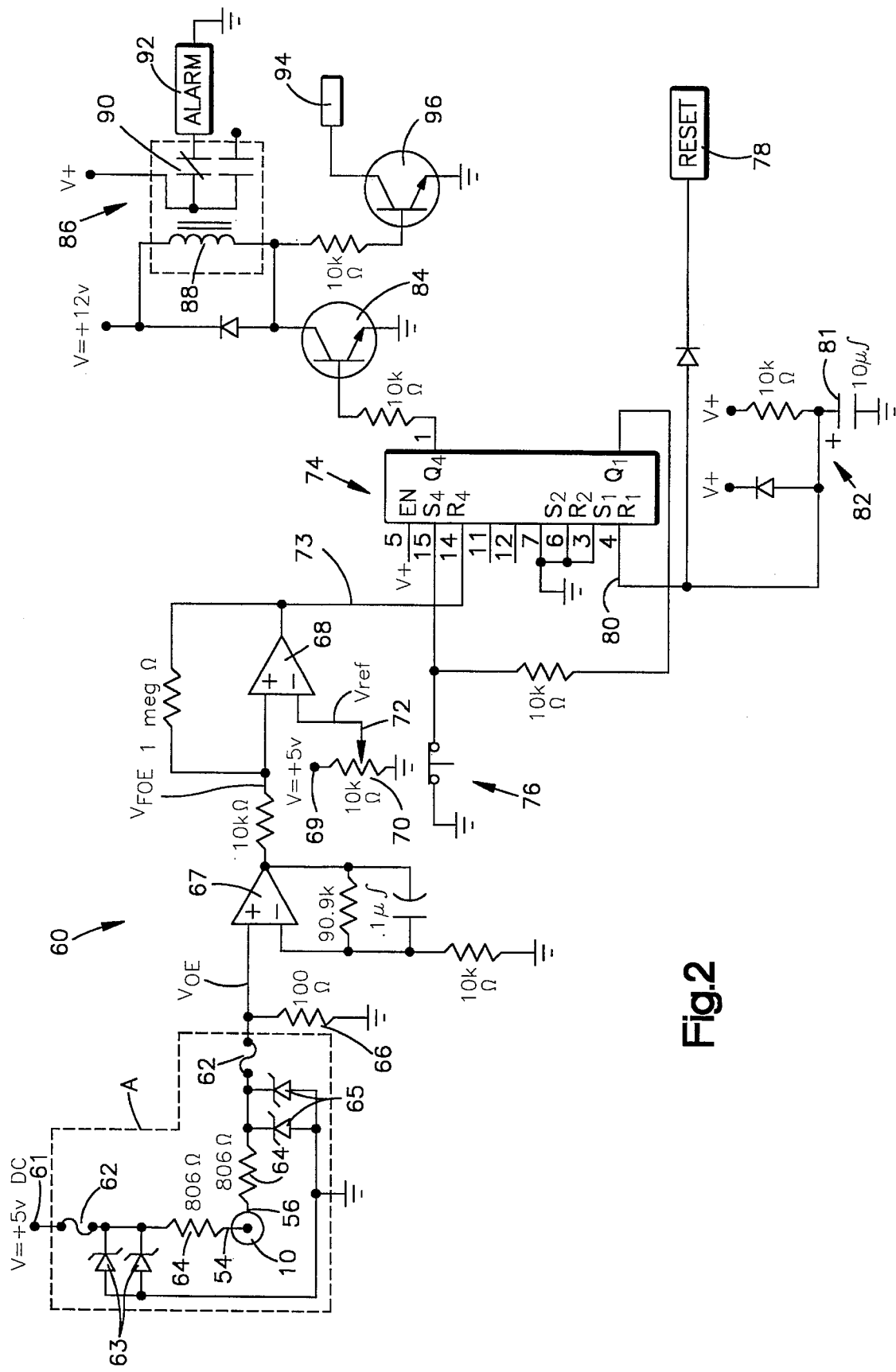
FIG. 2 is a schematic diagram of the rupture disk monitoring apparatus of the present invention.

FIG. 2 shows a schematic diagram of a monitoring circuit 60 constructed in accordance with a preferred embodiment of the present invention. The monitoring circuit 60 includes a DC power source 61 supplying, preferably, 5 volts. The power source 61 energized the rupture disk 10. An intrinsic safety barrier A is provided to limit a maximum current across the rupture disk 10, a maximum voltage at the input electrode 54 and a maximum voltage drop across the rupture disk 10, i.e., across the input and output electrodes 54, 56. The intrinsic safety barrier A permits operation of the rupture disk monitoring circuit 60 in hazardous environments, e.g., Class I, II, and III, Division 1, Group A through G environments.

The intrinsic safety barrier A includes a pair of fuses 62, a first pair of parallel zener diodes 63 connected to ground, a pair of resistors 64, one coupled to input electrode 54 and the other coupled to output electrode 56 and a second pair of parallel zener diodes 65 connected to ground. The two pairs of zener diodes 63, 65 are preferably Motorola 1N4735A, 6.2 V, 1 W zener diodes. The first pair of zener diodes 63 are coupled through fuse 62 to the power source 61 and are in parallel with the resistors 64, the rupture disk 10 and the second pair of zener diodes 65. The zener diodes 63 limits the voltage signal at the input electrode to 6.2 volts DC and limits the voltage across the input and output electrodes 54, 56 to the zener diode voltage, 6.2 volts DC, even if the resistance between the electrodes approaches infinity and the input power source 61 exceeds 5 volts. Similarly, the second pair of zener diodes 65 limits a voltage signal at a non-inverting (+) input of a first operational amplifier 67 to 6.2 volts DC.

The voltage signal, $V_{OE}$, at a top of grounded resistor 66 ($R_{GR}$) has a magnitude which is directly proportional to the ratio of the resistance $R_{GR}$ to sum of the resistance $R_{GR}$ plus the resistance between the electrodes of the rupture disk 10, $R_{RD}$, plus the resistance of the two series resistors 64, $R_{SR}$, that is, $R_{GR}/(R_{RD}, +R_{GR}+R_{SR})$. Assuming that the resistance between the electrodes of a disk which has ruptured $R_B$ is greater than the resistance between the electrodes of the same disk when intact, it is clear that the signal $V_{OE}$ will decrease upon rupture of the disk.

The rupture disk output electrode 56 is electrically coupled through one of the series resistors 64 to the first operational amplifier 67. The output signal, $V_{OE}$, is input to the non-inverting (+) input of the operational amplifier 67. The first operational amplifier 67 primarily functions as a filter to purge any stray high frequency signals which may be picked up from the environment by the energized burst disk 10 or other circuit components and also functions as a voltage amplifier.

The first operational amplifier 67 is electrically coupled to a second operational amplifier 68 which functions as a comparator. Two signals are input to the comparator 68, the output of the first operational amplifier voltage, $V_{FOE}$ (filtered output voltage), and a reference voltage, $V_{REF}$. As explained previously, the magnitude of the electrode output voltage, $V_{OE}$, and therefore, the filtered electrode output voltage, $V_{FOE}$, is dependent on the resistance between the electrodes, $R_B$. Upon rupture of the disk, the electrode output voltage and, therefore, the filtered electrode output voltage will decrease to new values, $V_{OE}'$ and $V_{FOE}'$ respectively.

The reference voltage, $V_{REF}$, input to the comparator amplifier 68 is adjustable. A DC voltage source 69 energizes a grounded potentiometer 70. Preferably, the DC voltage source 69 supplies 5 volts. The reference voltage is tapped off a wiper arm 72 of the potentiometer 70. The wiper arm 72 taps a portion of the voltage supplied by the voltage source 69. By moving the wiper arm 72 with respect to the potentiometer 70, the reference voltage supplied to the comparator operational amplifier 68 may be changed. In operation, the reference voltage will be set at a magnitude which is intermediate the filtered electrode output voltage when the rupture disk is intact and the filtered electrode output voltage of the disk when ruptured, $V_{FOE} > V_{REF} > V_{FOE}'$.

The comparator 68 emits one of two output signals 73 - a "high" magnitude output signal or a "low" magnitude output signal. The "high" magnitude output signal is emitted if the filtered electrode output voltage exceeds the reference voltage, $V_{REF}$. The "high" output signal indicates that the rupture disk 10 is intact. If the reference voltage magnitude equals or exceeds the filtered electrode output voltage, then the comparator 68 will emit a "low" magnitude output signal indicating that the disk 10 has experienced a rupture. The "low" magnitude signal results in activation of an indicator alarm circuit 86, as will be explained.

The comparator 68 is electrically coupled to a multiplexer 74 such as National Semiconductor Model No. 4044. Also connected to the multiplexer is a jumper switch 76. If the jumper switch 76 grounds pin 15 ($S_4$) of the multiplexer, as shown in FIG. 2, a pass-through mode is selected. A comparator output signal 73 is passed through to an output signal at pin 1 ($Q_4$) of the multiplexer. That is, if the comparator 68 emits a "high" magnitude output signal, multiplexer 74 pin 1 ($Q_4$) will also emit a "high" magnitude output signal indicating that the disk 10 is intact. If the comparator 68 emits a "low" magnitude output signal, the multiplexer 74 will also emit a "low" magnitude output signal indicating that the disk 10 is ruptured.

In the second multiplexer operating mode, with the jumper 76 open or removed, is a latching mode. If the comparator output drops to a "low" magnitude output, the multiplexer output signal is correspondingly reduced to a "low" magnitude indicating that the disk 10 is ruptured. The multiplexer output is then "latched" at the "low" magnitude output level regardless of subsequent changes in the comparator's output signal. The multiplexer "low" magnitude output signal is maintained until a multiplexer reset 78 is activated. Activating the multiplexer reset 78 grounds pin 4 ($R_1$) on the multiplexer 74. A charging circuit, shown generally at 82, has a capacitor 81 that rapidly discharges when the input 80 is pulled low by the activation of the multiplexer reset 78.

The multiplexer 74 is electrically coupled to an NPN common emitter bipolar junction transistor 84. The multiplexer output signal 85 is input to the base of the transistor 84. The transistor 84 functions as a switching transistor operating an indicator alarm relay, shown generally at 86. In the preferred embodiment, when the multiplexer output signal is "high" (rupture disk intact), the transistor output is "on," that is, emitting an output signal. The transistor output signal energizes relay coil 88 which keeps normally closed relay contact 90 open. If the multiplexer output signal falls to a "low" magnitude (disk is ruptured), the transistor output is turned "off," that is, no output signal emitted. Absence of a transistor output signal causes relay coil 88 to de-energize thereby allowing relay contact 90 to close. Closing the relay contact 90 activates an alarm 92 indicating that the disk 10 has ruptured.

An auxiliary output 94 supplies an alternate indication of the burst disk condition. With the transistor 84 conducting, the coil 88 is energized and an NPN transistor 96 is turned off. When the transistor 84 turns off, the transistor 96 turns on and pulls the output 94 low. This indication can be used as a communications signal or as a separate alarm activator.

While the present invention has been described in some degree of particularity, it is to be understood that those of ordinary skill in the art may make certain additions or modifications to, or deletions from, the described present embodiment of the invention without departing from the spirit or scope of the invention, as set forth in the appended claims.

We claim:

1. Monitoring apparatus for triggering an alarm indicator upon rupture of a pressure relief rupture disk supported in a pressure relief vent of a containment vessel, the disk being electrically conductive and including a membrane portion having two surfaces and adapted to rupture when the two surfaces are subjected to a pressure differential in excess of a threshold value, the monitoring apparatus comprising:

a) two spaced-apart electrodes affixed to the rupture disk for sensing a change in electrical resistance when the disk ruptures;

b) a rupture disk energizing circuit comprising a voltage source electrically coupled to one of the electrodes producing an electrode input voltage at one of the electrodes and producing an electrode output voltage at the electrodes and producing an electrode output voltage at the other of the electrodes, the electrode output voltage having a magnitude dependent upon an electrical resistance between the two electrodes;

c) comparison circuit means for comparing the electrode output voltage to a reference voltage having a magnitude which is different than a magnitude of the electrode input voltage and producing an output signal having a magnitude dependent on the comparison of the electrode output voltage magnitude and the reference voltage magnitude, the reference voltage being adjustable and the comparison circuit means including a first operational amplifier for comparing the electrode output voltage magnitude and the reference voltage magnitude and emitting one of two signals, one signal having a greater magnitude than the other, the greater magnitude signal selected for output when the electrode output voltage magnitude exceeds the reference voltage magnitude and the lower magnitude signal selected for output when the electrode output voltage magnitude is less than or equal to the reference voltage magnitude;

d) an alarm circuit electrically coupled to the comparison circuit means and operative to selectively trigger the alarm indicator in response to the comparison circuit means output signal; and e) the comparison circuit means further including a multiplexer electrically coupled to the first operational amplifier and emitting a selected one of two output signals, one of the signals having a greater magnitude than the other, the greater magnitude multiplexer output signal being selected for output when the greater magnitude operational amplifier output signal is detected and the lower magnitude multiplexer output signal being selected for output when the lower magnitude operational amplifier output signal is detected, the multiplexer additionally being electrically coupled to a two position jumper switch, the position of the jumper switch determining the operating mode of the multiplexer, in one operating mode, the multiplexer output signal continuously tracks the operational amplifier output signal, in the other operating mode, when the lower magnitude operational amplifier output signal is detected, the lower magnitude multiplexer output signal is emitted until a multiplexer reset is activated.

2. The monitoring apparatus of claim 1 wherein the comparison circuit means further includes a transistor electrically coupled to the multiplexer and emitting an output signal, the transistor adapted to selectively switch the output signal off or on in response to the magnitude of the multiplexer output signal.

3. The monitoring apparatus of claim 2 wherein the alarm circuit includes a relay electrically coupled to the transistor, the relay having open and closed states and adapted to switch from one state to the other state in response to a change in the transistor output signal.

4. The monitoring apparatus of claim 1 wherein the comparison circuit means further includes a second operational amplifier adapted to input the electrode output voltage, to filter out stray high frequency signals that enter rupture disk energizing circuit and to output the filtered electrode voltage output to the first operational amplifier.

5. The monitoring apparatus of claim 1 wherein the comparison circuit means adjustable reference voltage is produced by a circuit including a voltage source electrically coupled to a grounded potentiometer, the reference voltage being taken off an adjustable wiper arm of the potentiometer.

6. The monitoring apparatus of claim 1 wherein the rupture disk energizing circuit includes voltage limiting means for limiting the electrode input voltage magnitude, a current magnitude through said electrodes, and the electrode output voltage magnitude.

7. The monitoring apparatus of claim 6 wherein the voltage limiting means includes at least one fuse in series with the electrodes and at least one zener diode in parallel with the electrodes.

8. A monitoring circuit for monitoring a condition of an electrically conductive pressure relief rupture disk disposed in a containment vessel pressure relief conduit by sensing a resistance between two spaced-apart electrodes attached to the disk, the resistance between the electrodes dependant upon the condition of the disk, the monitoring circuit comprising:

a) an input signal means for applying a signal to one of the electrodes producing an electrode input signal at one of the electrodes and producing an output signal at the other of the two electrodes, the electrode output signal having a magnitude dependent on the resistance between the electrodes;

b) a comparison circuit means for comparing the electrode output signal magnitude to a reference signal which is different than the electrode input signal and generating an output signal having a magnitude dependent upon the comparison of the electrode output signal magnitude and a magnitude of the reference signal, the comparison circuit means including means for generating an output having one of two differing magnitude signals, one signal being generated when the electrode output signal magnitude exceeds the reference signal magnitude and the other signal being generated when the electrode output signal is less than or equal to the reference signal magnitude;

c) a switching circuit electrically coupled to the comparison circuit means, the switching circuit generating a selected one of two differing magnitude output signals based on an output from the comparison circuit means, one of the two different output signals indicating that the disk is in a ruptured condition;

d) an alarm circuit electrically coupled to the switching circuit output signal to selectively activate an alarm indicator when the switching circuit generates one of the two different output signals indicating that the disk is in the ruptured condition; and e) the reference signal being adjustable and the switching circuit including a transistor electrically coupled to a multiplexer and being adapted to selectively switch a transistor output signal off and on in response to a multiplexer output signal magnitude.

9. The monitoring circuit of claim 8 wherein the switching circuit includes a relay electrically coupled to the transistor, the relay having open and closed states and adapted to switch from one state to the other state in response to a change in the transistor output signal.

10. The monitoring circuit of claim 8 wherein the comparison circuit means further includes a second operational amplifier adapted to input the electrode output signal, to filter out stray high frequency signals that enter the circuit and to output the filtered electrode output signal to the first operational amplifier.

11. The monitoring circuit of claim 8 wherein the comparison circuit means adjustable reference signal is produced by a circuit including a power source electrically coupled to a grounded potentiometer, the reference signal being taken off an adjustable wiper arm of the potentiometer.

12. Monitoring apparatus for triggering an alarm indicator upon rupture of a pressure relief rupture disk, the monitoring apparatus comprising:

a) the pressure relief rupture disk supported in a pressure relief vent of a containment vessel, the disk being electrically conductive and including a membrane portion having two surfaces and adapted to rupture when the two surfaces are subjected to a pressure differential in excess of a threshold value;

b) two spaced-apart electrodes affixed to the rupture disk for sensing a change in electrical resistance when the disk ruptures;

c) a rupture disk energizing circuit comprising a voltage source electrically coupled to one of the electrodes and producing an electrode output voltage at the other of the electrodes, the electrode output voltage having a magnitude dependent upon an electrical resistance between the two electrodes, the rupture disk energizing circuit further including voltage limiting means for limiting a magnitude of a voltage signal at the one of the electrodes coupled to the voltage source, a current magnitude through said electrodes, and the electrode output voltage magnitude;

d) comparison circuit means for comparing the electrode output voltage to an adjustable reference voltage and producing an output signal having a magnitude dependent upon the comparison of the electrode output voltage and the reference voltage; and, e) an alarm circuit electrically coupled to the comparison circuit means and operative to selectively trigger the alarm indicator in response to the comparison circuit means output signal.

* * * * *